UNITED STATES PATENT OFFICE 2,431,889

MIXTURES OF DIAMINO DIPHENYL AZO COMPOUNDS

Alexander H. Popkin, Bronx, N. Y., assignor to Sun Chemical Corporation, a corporation of Delaware No Drawing. Application May 2, 1942, Serial No. 441,554

14 Claims. (Cl. 260—176)

This invention relates to a dyestuff or pigment, and more particularly to a pigment or class of pigments produced, by coupling, from a mixture of isomeric di-substituted derivatives of diphenyl.

As is well known, benzidine has heretofore been used as a dyestuff intermediate which, subjected to known reactions, would produce a variety of soluble dyestuffs and insoluble pigments. In connection with the preparation thereof the process commonly used for the manufacture of benzidine has consisted of reducing nitrobenzene with metallic zinc in an alkaline medium to form hydrazobenzene, the structure of which is represented by the following formula:

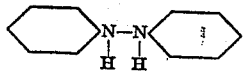

Hydrazobenzene after which the hydrazobenzene is subjected to rearrangement in the presence of an acid such as hydrochloric acid to form the benzidine, usually in the form of its hydrochloride as indicated by the following formula:

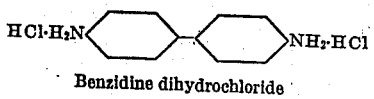

Benzidine dihydrochloride

It has also been known that the benzidine, as thus produced, and various derivatives of benzidine such as 3,3'-diphenylbenzidine or 3,3'-dichlorobenzidine are capable of coupling with various azo dye coupling components to form a variety of useful colored materials. Examples of such coupling components are, R-salt, H-acid, gamma acid, acetoacetanilide, and various others which are commercially known. Some of the compounds thus formed are soluble in water and are useful as textile dyeing materials. Others, however, are insoluble in water and therefore are particularly useful for pigmenting materials, as for paints and inks. For example, the material obtained by coupling tetrazotized 3,3'-dichlorobenzidine and acetoacetanilide gives a yellow pigment of useful properties particularly in inks and paints.

While the above described process of producing benzidine is well known, as stated; and while large quantities of benzidine are made according to this general process and also soluble and insoluble dyestuffs and pigments are produced commercially from benzidine; it is also well known that alkaline reductions are not as simple to run in regular plant procedures as are acid reduction procedures. Furthermore, it is known that such alkaline reductions frequently lead to the formation of undesirable and wasteful by-products, which require expensive technical control to avoid economically unimportant wastes and which under the best of circumstances leads to increased manufacturing costs for the desired end materials. Moreover, it is known that, unless very carefully controlled, the step of rearrangement under the influence of acid may likewise lead to the formation of undesirable and wasteful by-products. Despite these difficulties this process of forming benzidine from nitrobenzene in order to secure a pure intermediate without the admixture of other compounds, isomers, etc., has been generally used commercially and great care has been exercised thus to produce the pure compound.

One of the principal objects of the present invention is to provide a pigment produced by azotizing and then coupling a reaction mixture of isomeric diamino substituted derivatives of diphenyl.

Another object is to produce a pigment from a reaction mixture of isomers of benzidine coupled with a member of a selected class of azo coupling components.

Still another object is to produce a pigment from mixed isomeric diaminodiphenyls by tetrazotizing said mixture and then coupling with a methylenic azo coupling component.

Another object of the invention is to provide a process of producing such a pigment which is simpler and cheaper than the process as heretofore used in the making of a pigment from benzidine by the tetrazotizing and coupling of the benzidine as hereinabove described.

Another object of the invention is to provide such a process of producing a pigment which includes the producing of a dyestuff intermediate comprising mixed isomers of benzidine and treating such reaction mixture of mixed isomers to produce the pigment by coupling with a methylenic azo coupling component.

Another object of this invention is to provide a process of producing a class of pigments, which is simple and easy of control and produces a new class of pigments.

Another object is to provide such a simple and easily controlled process which comprises producing a reaction mixture of isomeric diaminodiphenyls, or the diacid salts thereof, tetrazotizing said mixture and coupling with a methylenic azo coupling component.

Other objects and advantages of the invention will be apparent from the following description and claims.

As stated in my copending application Serial No. 441,553 filed of even date herewith, I have found that by nitration, a mixture of two isomeric dinitrodiphenyls may be produced, and in carrying out the present invention very satisfactory and successful results have been attained with comparative cheapness and simplicity in controls and operation, by nitration to produce mixed isomeric dinitrodiphenyls having the structures illustrated by the following formulas:

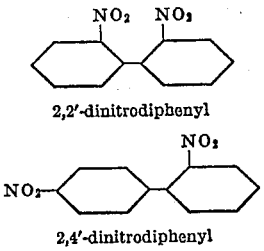

2,2'-dinitrodiphenyl 2,4'-dinitrodiphenyl

When the reaction mixture of isomeric compounds so produced is reduced in the proportions resulting from the reaction, and without any effort at separation to secure the several isomeric compounds in the separated or pure state, under conditions of acid reduction, the nitro groups, during the reaction, will be reduced to form a mixture of isomeric diaminodiphenyls of formulas as follows:

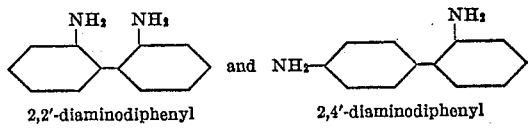

2,2'-diaminodiphenyl    2,4'-diaminodiphenyl

These resulting mixed diaminodiphenyls are isomeric with benzidine and it has been found that very satisfactory results are secured with the use of such reaction mixture of isomeric diaminodiphenyls as illustrated.

The processes of nitration and reduction, generally, are well known to those skilled in this chemical industry and are subject to substantial variation while still effecting the desired reactions and resulting products. In practice, and to illustrate practical procedure for carrying out this invention, such dinitrodiphenyl has been conveniently and satisfactorily prepared in the following manner,

|  | Grams |
|---|---|
| o-Nitrodiphenyl | 2,277.6 |
| Sulphuric acid 65.5–66° Baumé | 1,008.0 |
| Nitric acid 89–95% HNO₃ specific gravity 1.44–1.50 | 884.0 |

The o-nitrodiphenyl is placed in a suitable container, warmed to about 55° C. at which point it is present as a liquid material. The acids which have been pre-mixed are then added slowly while the mixture is subjected to vigorous stirring and cooling by means of a water bath.

The rate of addition of mixed acids and the amount of cooling are so regulated that the temperature of the reaction mixture remains at about 55–60° C. during the addition of the acid which requires about 20 minutes. Following the addition of the acid the temperature of the reaction mass is slowly raised to about 80° by warming the surrounding bath. This temperature may then be maintained for a period of from 4–5 hours meanwhile the stirring is continued.

At the end of the reaction period as indicated above, the oily dinitrodiphenyl is separated from the residual mixed acids and if desired may be purified by washing with water followed by a washing with a 5% solution of soda ash in water, and again washing with clear water. In case it is desired to pass directly to the reduction step, which may be practiced as indicated below, it may be found convenient to avoid the purification step since some acids are required for the reduction.

The reaction product obtained from the above nitration step is believed to be essentially a mixture of 2,2'-dinitrodiphenyl and 2,4'-dinitrodiphenyl. The amount of material obtained is about 2,772 grams, representing a yield of slightly over 99% of the theoretical yield.

The mixed dinitrodiphenyl compounds obtained in the above nitration procedure, are next reduced to the mixed diamino derivatives satisfactorily in the following way:

| Dinitrodiphenyls | grams | 1,000 |
|---|---|---|
| Water | cubic centimeters | 1,500 |
| Iron powder | grams | 1,378 |
| Hydrochloric acid concentrated aqueous sol | cubic centimeters | 50 |

The water and dinitrodiphenyls are placed in a suitable container and heated to about 95° C. After the dinitrodiphenyl has melted the mass may be vigorously stirred. When the temperature has reached 95° C. 50 cubic centimeters of concentrated hydrochloric acid is added and then the addition of iron is begun adding it in small quantities and maintaining the temperature at 95° C. by control of the rate of additions of iron. The addition of the iron occupies the time of approximately 3 hours. A more rapid rate of iron addition would cause the reaction to proceed with undue vigor and perhaps with loss of material. After all the iron has been added the reaction is permitted to continue until there is no further heat of reaction and the mass begins to show signs of rapid cooling. At this stage the material is made alkaline by the addition of 250 cc. of saturated sodium carbonate solution and shows a pH with hydrion paper of 8–10.

Following neutralization of the reaction mass it is allowed to cool and water is removed by filtration from the mixture of unreacted iron, iron oxide and free base, which is believed to be essentially a mixture of 2,2'-diaminodiphenyl and 2,4'-diaminodiphenyl.

After filtration the entire sludge which includes the reaction mixture of isomers may be extracted by an organic solvent in which the free base is soluble, such as benzol, and upon filtration the free base will be present in solution in the organic solvent.

The mixture of 2,2'-diaminodiphenyl and 2,4'-diaminodiphenyl may then be separated from the organic solvents by precipitation as acid salts thereof, satisfactorily in the form of their hydrochlorides through the introduction of gaseous hydrochloric acid. Following the precipitation the organic solvents may be filtered off leaving the mixed benzidine isomer hydrochlorides in the proportions resulting from the several reactions as an essentially white powdery solid after drying.

The resulting white powdery solid, consisting of mixed benzidine isomer hydrochlorides, believed to be essentially a mixture of 2,2'- and 2,4'-mixed isomers of benzidine in the form of hydrochlorides can then be tetrazotized and coupled with methylenic azo dye coupling components to produce satisfactory and hitherto unknown pigments.

Also, satisfactorily, diphenyl may be nitrated to produce a reaction mixture of isomeric dinitrodiphenyls, which reaction mixture may then be subjected to acid reduction to produce mixed isomeric diaminodiphenyls. The resulting reaction mixture of isomeric diaminodiphenyl is believed to include primarily the 2,2'- and 2,4'-diaminodiphenyls referred to above and the 4,4'-diaminodiphenyl which is benzidine. The reaction mixture resulting from the nitration is also believed to contain extremely small quantities of other isomeric dinitrodiphenyls, e. g. the 3,3'- and the 3,2'-, but these isomers are in extremely small quantity and seem to have no adverse or controlling effect upon the subsequent reactions and the characteristics of the dyestuffs intermediate and the resultant pigment or dyestuff produced therefrom.

Proper procedure for satisfactorily producing such mixed isomeric diaminodiphenyls is illustrated by way of the following steps explained in connection with the utilization of small quantities of materials. 77 grams (0.5 mole) of pure (solid) diphenyl was melted in a tall liter beaker, and raised to 80° C. A mixture of 77 grams (1.1 mole) of fuming nitric acid (89–95%) in 96.2 grams of concentrated sulphuric acid was then added to the melted diphenyl, during 20 minutes. The temperature during this addition varied generally from 77 to 98° C., although at one time the temperature rose to as high as 118° C. The addition of the mixed acids being completed, the mixed mass was stirred for 20 minutes, the temperature being maintained at 85–95° C. by heat of nitration. When the temperature began to drop, the heat was raised, during 12 minutes to 135° C. and the mass then quickly cooled to room temperature with ice.

The acids were then removed by decantation, and the gummy nitration product, comprising primarily a mixture of 2,2'-dinitrodiphenyl, 2,4'-dinitrodiphenyl and 4,4'-dinitrodiphenyl, together with probably extremely small quantities of other isomers, such as the 3,3'- and the 3,2'-, was washed three times with 200 cc. of tap water. The last washing was still strongly acid.

The resulting nitration product was present as a yellow gummy mass. This was treated with 200 cc. of water and the mixture raised to 95° C. A total of 168 grams (3 moles) of iron dust was weighed out, and 12 grams of this iron dust and 29 cc. of hydrochloric acid were then added. The reaction was not unduly vigorous and the temperature dropped to 85° C. The balance of the weighed iron was then added during 15 minutes at temperatures between 80–90° C. This final addition was accompanied by a very vigorous and exothermic reaction which raised the temperature to 100° C. and kept it at that temperature for 15 minutes. An additional portion of iron (56 grams, 1 mole) was then added and a similar vigorous reaction was obtained during 10 minutes. Very vigorous stirring was effected. The mass was then made alkaline by sodium carbonate. At this stage the mass contained the reaction mixture of diaminodiphenyls corresponding to the dinitro compounds described above, and including primarily benzidine and its 2,2'- and 2,4'-isomers.

In order to separate the mixed isomeric diaminodiphenyls from the iron sludge and other waste products the mass was treated with 1.2 liters of benzene at the boiling point; and then filtered over suction, the resulting benzene solution filtrate having an orange-red appearance. Two extractions were again made on the reduction mass, a total of 3.5 liters of benzene being used. This was a much greater excess of benzene than was necessary for the extraction, but was used to insure ease and completeness of solution. In this way all of the isomers were removed from the reaction mass, and appeared in solution in the benzene filtrate.

The free bases were then converted to the hydrochlorides and in order to do so the benzene solutions were combined and boiled until no water was present. The solution was then cooled to 65° C. and gaseous hydrochloric acid added. A white precipitate resulted. Hydrochloric acid was added until all of the free base had been precipitated as the hydrochloride. The mixture was then filtered and the precipitate washed with 300 cc. of benzol and dried for 5½ hours at 78–85° C. The weight of the white precipitate was 105.5 grams. This represents an 82% yield of product, based on the precipitate as dihydrochloride, for the two reactions, i. e. nitration and reduction. This dry solid product comprised the hydrochlorides of the isomeric diaminodiphenyls described above.

This mixture of hydrochlorides comprised primarily 2,2'-diaminodiphenyl, 2,4'-diaminodiphenyl and 4,4'-diaminodiphenyl hydrochlorides, and probably the extremely small quantities of the other isomeric compounds as stated.

As the mixture of 2,2'- and 2,4'-diaminodiphenyls provides a valuable dyestuff intermediate which may be utilized for producing dyestuffs and pigments, as hereinafter described, and as the price of benzidine is comparatively quite high with respect to the price of diphenyl, the benzidine is now advantageously separated from the reaction mixture of isomeric diaminodiphenyls and the mixture of 2,2'- and 2,4'-isomeric diaminodiphenyls may then be utilized as a dyestuff intermediate. To accomplish this separation said mixture of isomeric hydrochlorides was dissolved in warm water, and sulfuric acid of 40% concentration was added to precipitate the benzidine as benzidine sulfate which may be utilized, and in this way a source of benzidine is secured while the preparation of the desired mixed isomeric diaminodiphenyl dyestuff intermediate is likewise effected. The filtrate from which the benzidine sulfate was thus separated contains primarily the mixture of 2,2'-diaminodiphenyl hydrochloride and 2,4'-diaminodiphenyl hydrochloride, herein for convenience referred to as 2-X'-diaminodiphenyl hydrochlorides.

Satisfactory pigments or dyestuffs are secured when the reaction mixture of isomeric diaminodiphenyls is tetrazotized and coupled with suitable azo dye coupling components to form colored pigments or dyestuffs, containing mixtures corresponding to the isomeric mixtures referred to. According to the processing the dyestuffs may be either soluble dyes or insoluble pigments, both being comprehended within the term dyestuffs as used herein.

*Example I.—Coupling with acetoacetanilide*

As illustrative of a satisfactory procedure for processing dyestuff intermediate comprising the reaction mixture of isomeric diaminodiphenyls, the reaction mass comprising primarily the 2,2'- and 2,4'-diaminodiphenyls may be used to produce a substantially insoluble pigment dyestuff, in the following manner, to effect tetrazotizing, a solution of the benzidine hydrochloride mixed isomers was made up by dissolving 9.2 grams of the 2-X'-diaminodiphenyls in 250 cc. of water to which 14 grams of 20° Bé. hydrochloric acid had been added. The solution was brought to 100° C. to dissolve the isomers, then cooled to 50° C. and further cooled with ice to 0° C. The tetrazotization was carried out by adding 14 grams of hydrochloric acid at 20° Bé. to the cooled solution of isomers, stirring 5 minutes, and adding 6.9 grams of sodium nitrite dissolved in 34.5 cc. of water. The reaction was continued for half an hour at 0°–5° C. whereupon 8 grams of a filter aid was added. After stirring for 5 minutes, 28 grams of 70% acetic acid together with 24.6 grams of sodium acetate was added. The mass was stirred for 10 minutes, then filtered and made up to 800 cc. volume with water, and was then ready for coupling.

A suitable illustrative coupling solution was made up by dissolving 19 grams of acetoacetanilide in 45 cc. of water, containing 4.5 grams of sodium hydroxide and then diluting the solution with water to 1 liter, and cooling to 5° C. The coupling was then carried out by mixing the tetrazotized 2-X'-diaminodiphenyls with this acetoacetanilide solution, and allowing the coupling reaction to go to completion, after which stirring was continued for 30 minutes and then the mixture brought slowly to 65° C. and held at that temperature for one half hour.

After completion of the coupling as described above the pigment is present in the form of a lemon yellow solid of good tinctorial value. It may then be filtered in any suitable manner, for example by filter pressing, washed with water and dried by gentle heating. If desired the pigment may be subjected to resination before filtration, or the pigment may be separated from the watery mass by flushing.

*Example II.—Coupling with orthochlor acetoacetanilide*

Likewise the mixed isomeric diaminodiphenyls produced as described may be tetrazotized and coupled with orthochlor acetoacetanilide to produce a desirable and valuable pigment. The mixture of isomeric diaminodiphenyls having been tetrazotized as described above, may then be coupled with a solution prepared according to the following manner:

23.2 grams of orthochlor acetoacetanilide was dissolved in 45 cc. of water containing 4.5 grams of sodium hydroxide. The resulting solution was diluted with water and cooled to 5° C. The coupling was carried out as described above in connection with coupling of tetrazotized 2-X'-diaminodiphenyls. The resulting pigment in this case was also a lemon yellow of good tinctorial value, and it may be filtered as described in Example I above or treated in any of the ways there described.

*Example III.—Coupling with acetoacet-o-toluidide*

The tetrazotized solution of mixed isomers of diaminodiphenyl may be satisfactorily coupled with acetoacet-o-toluidide as in accordance with the following procedure: 21 grams of acetoacet-o-toluidide was dissolved in 45 cc. of water containing 4.5 grams of sodium hydroxide and made up to one liter with water. The coupling was then accomplished by use of this solution with the admixture of isomeric diaminodiphenyls as described above in Example I, using the solution of tetrazotized 2-X'-diaminodiphenyl there described. The coupling resulted in a lemon yellow pigment of good tinctorial strength and slightly redder shade than those of the two previous examples.

*Example IV.—Coupling with phenyl methyl pyrazolone*

A satisfactory pigment may also be secured by coupling the tetrazotized mixture of isomeric diaminodiphenyl, as in the following manner, the coupling solution was prepared by dissolving 18.7 grams of phenyl methyl pyrazolone in 45 cc. of water containing 4.5 grams of sodium hydroxide. This solution was then made up to 1800 cc. volume with water. The coupling was carried out as described in Example I using a solution of tetrazotized 2-X'-diaminodiphenyl as there described and as a result an orange pigment of good tinctorial strength is secured.

It is to be understood that the chemical reactions of tetrazotizing and coupling in the dyestuff industry are generally well understood and that the above illustrations are exemplary and that changes may be made without materially affecting the pigments secured, and that the tetrazotizing and coupling procedures may be applied with respect to the reaction mixtures of isomeric diaminodiphenyls as produced above, and from the resultant 2,2'- and 2,4'-mixture as produced from diphenyl.

Pigments prepared as described above are essentially insoluble in water and may be dispersed in oils or oily vehicles or solutions of synthetic or natural resins in solvents to form inks, paints, and other useful materials.

While the products herein described and the methods of producing the same constitute preferred embodiments of the invention, it is to be understood that the invention is not limited to these precise products and methods, and that changes may be made therein without departing from the scope of the invention which is defined in the appended claims.

What is claimed is:

1. A dyestuff or pigment characterized by good tinctorial value and comprising a co-reacted mixture of disazo compounds prepared by a process including the steps of nitrating a diphenyl compound selected from the class consisting of diphenyl and ortho-nitrodiphenyl under conditions producing a mixture of at least two dinitrodiphenyl compounds selected from the class consisting of 2,2'-dinitrodiphenyl, 2,4'-dinitrodiphenyl, and 4,4'-dinitrodiphenyl, which mixture is substantially free of other dinitrodiphenyl compounds; subjecting said mixture of unseparated dinitrodiphenyl compounds to reduction under conditions producing a reaction mixture containing the corresponding diaminodiphenyl compounds from the class consisting of 2,2'-diaminodiphenyl, 2,4'-diaminodiphenyl, and 4,4'-diaminodiphenyl, which said reaction mixture is substantially free of other diaminodiphenyl compounds; separating from said reaction mixture a mixture of 2,2'-diaminodiphenyl and 2,4'-diaminodiphenyl compounds substantially free of other diaminodiphenyl compounds; tetrazotizing said mixture of unseparated 2,2'-diaminodiphenyl and 2,4'-diaminodiphenyl compounds; and coupling the unseparated tetrazotized compounds with a dye coupling component having an active methylenic group.

2. A dyestuff or pigment characterized by good tinctorial value and comprising a co-reacted mixture of disazo compounds prepared by a process including the steps of nitrating ortho-nitrodiphenyl under conditions producing a mixture of 2,2'-dinitrodiphenyl and 2,4'-dinitrodiphenyl substantially free of other dinitrodiphenyl compounds; subjecting said mixture of unseparated dinitrodiphenyl compounds to reduction under conditions producing a mixture of 2,2'-diaminodiphenyl and 2,4'-diaminodiphenyl substantially free of other diaminodiphenyl compounds; tetrazotizing said mixture of unseparated diaminodiphenyl compounds; and coupling the unseparated tetrazotized compounds with a dye coupling component having an active methylenic group.

3. A dyestuff or pigment characterized by good tinctorial value and comprising a co-reacted mixture of disazo compounds prepared by a process including the steps of nitrating diphenyl under conditions producing a mixture of 2,2'-dinitrodiphenyl, 2,4'-dinitrodiphenyl, and 4,4'-dinitrodiphenyl substantially free of other dinitrodiphenyl compounds; subjecting said mixture of unseparated dinitrodiphenyl compounds to reduction under conditions producing a reaction mixture containing 2,2'-diaminodiphenyl, 2,4'-diaminodiphenyl, and 4,4'-diaminodiphenyl substantially free of other diaminodiphenyl compounds; separating from said reaction mixture a mixture of at least two diaminodiphenyl isomers; tetrazotizing the last said mixture without separating the diaminodiphenyl constituents thereof; and coupling the unseparated tetrazotized compounds with a dye coupling component having an active methylenic group.

4. A dyestuff or pigment characterized by good tinctorial value and comprising a co-reacted mixture of disazo compounds prepared by a process including the steps of nitrating diphenyl under conditions producing a mixture of 2,2'-dinitrodiphenyl, 2,4'-dinitrodiphenyl, and 4,4'-dinitrodiphenyl substantially free of other dinitrodiphenyl compounds; subjecting said mixture of unseparated dinitrodiphenyl compounds to reduction under conditions producing a mixture of 2 2'-diaminodiphenyl, 2,4'-diaminodiphenyl, and 4,4'-diaminodiphenyl susbtantially free of other diaminodiphenyl compounds; separating 4,4'-diaminodiphenyl compound from said mixture and leaving a mixture of unseparated 2,2'-diaminodiphenyl and 2,4'-diaminodiphenyl compounds substantially free of other diaminodiphenyl compounds; tetrazotizing said unseparated mixture of 2,2'-diaminodiphenyl and 2,4'-diaminodiphenyl compounds; and coupling the unseparated tetrazotized compounds with a dye coupling component having an active methylenic group.

5. A dyestuff or pigment characterized by good tinctorial value and comprising a co-reacted mixture of disazo compounds prepared by a process including the steps of nitrating ortho-nitrodiphenyl under conditions producing a mixture of 2,2'-dinitrodiphenyl, and 2 4'-dinitrodiphenyl substantially free of other dinitrodiphenyl compounds; subjecting said mixture of unseparated dinitrodiphenyl compounds to reduction under conditions producing a mixture of 2,2'-diaminodiphenyl and 2,4'-diaminodiphenyl substantially free of other diaminodiphenyl compounds; tetrazotizing said unseparated mixture of 2,2'-diaminodiphenyl and 2,4'-diaminodiphenyl compounds; and coupling the unseparated tetrazotized compounds with acetoacetanilide.

6. A dyestuff or pigment characterized by good tinctorial value and comprising a co-reacted mixture of disazo compounds prepared by a process including the steps of nitrating ortho-nitrodiphenyl under conditions producing a mixture of 2,2'-dinitrodiphenyl, and 2,4'-dinitrodiphenyl substantially free of other dinitrodiphenyl compounds; subjecting said mixture of unseparated dinitrodiphenyl compounds to reduction under conditions producing a mixture of 2,2'-diaminodiphenyl and 2,4'-diaminodiphenyl substantially free of other diaminodiphenyl compounds; tetrazotizing said unseparated mixture of 2 2'-diaminodiphenyl and 2,4'-diaminodiphenyl compounds; and coupling the unseparated tetrazotized compounds with acetoacet-o-chloranilide.

7. A dyestuff or pigment characterized by good tinctorial value and comprising a co-reacted mixture of disazo compounds prepared by a process including the steps of nitrating ortho-nitrodiphenyl under conditions producing a mixture of 2,2'-dinitrodiphenyl, and 2,4'-dinitrodiphenyl substantially free of other dinitrodiphenyl compounds; subjecting said mixture of unseparated dinitrodiphenyl compounds to reduction under conditions producing a mixture of 2,2'-diaminodiphenyl and 2,4'-diaminodiphenyl substantially free of other diaminodiphenyl compounds; tetrazotizing said unseparated mixture of 2,2'-diaminodiphenyl and 2,4'-diaminodiphenyl compounds; and coupling the unseparated tetrazotized compounds with phenyl methyl pyrazolone.

8. A method of preparing a dyestuff or pigment essentially consisting of a mixture of different disazo compounds and being characterized by good tinctorial value such as is exhibited by dyestuffs and pigments containing a single tetrazo compound, comprising the steps of nitrating a diphenyl compound selected from the class consisting of diphenyl and ortho-nitrodiphenyl under conditions producing a mixture of at least two dinitrodiphenyl compounds selected from the class consisting of 2,2'-dinitrodiphenyl, 2 4'-dinitrodiphenyl and 4 4'-dinitrodiphenyl, which mixture is substantially free of other dinitrodiphenyl compounds; subjecting said mixture of unseparated dinitrodiphenyl compounds to reduction under conditions producing a reaction mixture containing the corresponding diaminodiphenyl compounds from the class consisting of 2,2'-diaminodiphenyl, 2,4'-diaminodiphenyl and 4,4'-diaminodiphenyl, which said reaction mixture is substantially free of other diaminodiphenyl compounds; separating from said reaction mixture a mixture of 2 2'-diaminodiphenyl and 2,4'-diaminodiphenyl compounds substantially free of other diaminodiphenyl compounds; tetrazotizing said mixture of unseparated 2,2'-diaminodiphenyl and 2,4'-diaminodiphenyl compounds; and coupling the unseparated tetrazotized compounds with an azo dye coupling component.

9. A method of preparing a dyestuff or pigment essentially consisting of a mixture of different disazo compounds and being characterized by good tinctorial value such as is exhibited by dyestuffs and pigments containing a single tetrazo compound, comprising the steps of nitrating ortho-nitro diphenyl under conditions producing a mixture of 2,2'-dinitrodiphenyl and 2,4'-dinitrodiphenyl substantially free of other dinitrodiphenyl compounds; subjecting said mixture of unseparated dinitrodiphenyl compounds to reduction under conditions producing a mixture of 2,2'-diaminodiphenyl and 2,4'-diaminodiphenyl substantially free of other diaminodiphenyl compounds; tetrazotizing said mixture of unseparated diaminodiphenyl compounds; and coupling the unseparated tetrazotized compounds with an azo dye coupling compound.

10. A method of preparing a dyestuff or pigment essentially consisting of a mixture of different disazo compounds and being characterized by good tinctorial value such as is exhibited by dyestuffs and pigments containing a single tetrazo compound, comprising the steps of nitrating diphenyl under conditions producing a mixture of 2,2'-dinitrodiphenyl, 2,4'-dinitrodiphenyl and 4,4'-dinitrodiphenyl substantially free of other dinitrodiphenyl compounds; subjecting said mixture of unseparated dinitrodiphenyl compounds to reduction under conditions producing a reaction mixture containing 2,2'-diaminodiphenyl, 2,4'-diamindiphenyl and 4,4'-diaminodiphenyl substantially free of other diaminodiphenyl compounds; separating 4,4'-diaminodiphenyl compound from said mixture to leave a mixture of unseparated 2,2'-diaminodiphenyl compound and 2,4'-diaminodiphenyl compound substantially free of other diaminodiphenyl compounds; tetrazotizing said unseparated mixture of 2,2'-diaminodiphenyl compound and 2,4'-diaminodiphenyl compound; and coupling the unseparated tetrazotized compounds with an azo dye coupling component.

11. A dyestuff or pigment characterized by good tinctorial value and comprising a co-reacted mixture of disazo compounds prepared by a process including the steps of nitrating a diphenyl compound selected from the class consisting of diphenyl and ortho-nitrodiphenyl under conditions producing a mixture of at least two dinitrodiphenyl compounds selected from the class consisting of 2,2'-dinitrodiphenyl, 2,4'-dinitrodiphenyl and 4,4'-dinitrodiphenyl, which mixture is substantially free of other dinitrodiphenyl compounds; subjecting said mixture of unseparated dinitrodiphenyl compounds to reduction under conditions producing a reaction mixture containing at least two diaminodiphenyl compounds selected from the class consisting of 2,2'-diaminodiphenyl, 2,4'-diaminodiphenyl and 4,4'-diaminodiphenyl, which said reaction mixture is substantially free of other diaminodiphenyl compounds; separating from said reaction mixture a mixture of 2,2'-diaminodiphenyl and 2,4'-diaminodiphenyl compounds substantially free of other diaminodiphenyl compounds; tetrazotizing said mixture of unseparated 2,2'-diaminodiphenyl and 2,4'-diaminodiphenyl compounds; and coupling the unseparated tetrazotized compounds with an azo dye coupling component.

12. A dyestuff or pigment characterized by good tinctorial value and comprising a co-reacted mixture of disazo compounds prepared by a process including the steps of nitrating ortho-nitrodiphenyl under conditions producing a mixture of 2,2'-dinitrodiphenyl and 2,4'-dinitrodiphenyl substantially free of other dinitrodiphenyl compounds; subjecting said mixture of unseparated dinitrodiphenyl compounds to reduction under conditions producing a mixture of 2,2'-diaminodiphenyl and 2,4'-diaminodiphenyl substantially free of other diaminodiphenyl compounds; tetrazotizing said mixture of unseparated diaminodiphenyl compounds; and coupling the unseparated tetrazotized compounds with an azo dye coupling component.

13. A dyestuff or pigment characterized by good tinctorial value and comprising a co-reacted mixture of disazo compounds prepared by a process including the steps of nitrating diphenyl under conditions producing a mixture of 2,2'-dinitrodiphenyl, 2,4'-dinitrodiphenyl and 4,4'-dinitrodiphenyl substantially free of other dinitrodiphenyl compounds; subjecting said mixture of unseparated dinitrodiphenyl compounds to reduction under conditions producing a reaction mixture of 2,2'-diaminodiphenyl, 2,4'-diaminodiphenyl and 4,4'-diaminodiphenyl substantially free of other diaminodiphenyl compounds; separating a mixture of at least two diaminodiphenyl compounds from said reaction mixture; tetrazotizing the last said mixture without separating the diaminodiphenyl constituents thereof; and coupling the unseparated tetrazotized compounds with an azo dye coupling component.

14. A dyestuff or pigment characterized by good tinctorial value and comprising a co-reacted mixture of disazo compounds prepared by a process including the steps of nitrating diphenyl under conditions producing a mixture of 2,2'-dinitrodiphenyl, 2,4'-dinitrodiphenyl and 4,4'-dinitrodiphenyl substantially free of other dinitrodiphenyl compounds; subjecting said mixture of unseparated dinitrodiphenyl compounds to reduction under conditions producing a mixture of 2,2'-diaminodiphenyl, 2,4'-diaminodiphenyl and 4,4'-diaminodiphenyl substantially free of other diaminodiphenyl compounds; separating the 4,4'-diaminodiphenyl compound from said mixture and leaving a mixture of unseparated 2,2'-diaminodiphenyl and 2,4'-diaminodiphenyl compounds substantially free of other diaminodiphenyl compounds; tetrazotizing said mixture of unseparated 2,2'-diaminodiphenyl and 2,4'-diaminodiphenyl compounds; and coupling the unseparated tetrazotized compounds with an azo dye coupling component.

ALEXANDER H. POPKIN.

REFERENCES CITED

The following references are of record in the file of this patent:

UNITED STATES PATENTS

| Number | Name | Date |
|---|---|---|
| 2,227,504 | Krzikalla et al. | Jan. 7, 1941 |
| 1,959,733 | Niemann | May 22, 1939 |
| 2,189,806 | Lang | Feb. 13, 1940 |